US012724108B2

(12) United States Patent
Alush et al.

(10) Patent No.: US 12,724,108 B2
(45) Date of Patent: Sep. 1, 2026

(54) SYSTEM AND METHOD FOR DETERMINING A DIRECTION OF AN EMITTER RELATIVE TO A PLATFORM

(71) Applicant: ELBIT SYSTEMS EW AND SIGINT-ELISRA LTD., Holon (IL)

(72) Inventors: Henry Victor Alush, Holon (IL); Asher Keren Akerman, Holon (IL); Alexander Shender, Holon (IL); Yaron Naor, Holon (IL)

(73) Assignee: ELBIT SYSTEMS EW AND SIGINT-ELISRA LTD., Holon (IL)

( * ) Notice: Subject to any disclaimer, the term of this patent is extended or adjusted under 35 U.S.C. 154(b) by 0 days.

(21) Appl. No.: 19/536,293

(22) Filed: Feb. 11, 2026

(65) Prior Publication Data

US 2026/0169122 A1 Jun. 18, 2026

Related U.S. Application Data

(63) Continuation of application No. PCT/IL2025/050535, filed on Jun. 18, 2025.

(30) Foreign Application Priority Data

Jun. 27, 2024 (IL) ........................................ 314158

(51) Int. Cl.
*G06N 20/00* (2019.01)
*G01S 3/14* (2006.01)
(Continued)

(52) U.S. Cl.
CPC ................ *G01S 7/021* (2013.01); *G01S 3/14* (2013.01); *G01S 7/003* (2013.01); *G06N 20/00* (2019.01); *H04W 4/029* (2018.02)

(58) Field of Classification Search
CPC ............ G01S 7/021; G01S 3/14; G01S 7/003; G06N 20/00; H04W 4/029
See application file for complete search history.

(56) References Cited

U.S. PATENT DOCUMENTS 5,526,001 A * 6/1996 Rose ...................... G01S 3/023 342/450
7,843,375 B1 * 11/2010 Rennie .................... G01S 7/021 342/75

(Continued)

OTHER PUBLICATIONS

Ata'a, A. W. et al., "Deinterleaving of radar signals and PRF identification algorithms". Radar, Sonar & Navigation, IET. 1. 340-347. 10.1049/iet-rsn:20070037.

(Continued)

*Primary Examiner* — Manuel A Rivera Vargas
(74) *Attorney, Agent, or Firm* — S.J. INTELLECTUAL PROPERTY LTD.

(57) ABSTRACT

The presently disclosed subject matter relates to a system and method for determining a direction of an emitter relative to a platform, the system comprising: a detection system, mounted on the platform, capable of providing one or more PDWs based on an analysis of at least one received signal; and, a processing circuitry, being in an interaction with said detection system, configured to: obtain: (i) a machine learning model capable of receiving: (a) one or more given PDWs associated with a given emitter, and (b) one or more given parameters associated with a given platform, and determining the direction of said given emitter relative to said given platform, (ii) the one or more PDWs of said emitter, provided by said detection system, and, (iii) one or more parameters associated with said platform; and, determine, utilizing said obtained (i) to (iii), the direction of said emitter relative to said platform.

11 Claims, 2 Drawing Sheets

300

302
obtain: (i) a machine learning model, capable of receiving: (a) one or more given PDWs associated with a given emitter, and (b) one or more given parameters associated with a given platform, and determining the direction of said given emitter relative to said given platform, (ii) the one or more PDWs of said emitter, provided by said detection system, and, (iii) one or more parameters associated with said platform; and, 304
determine, utilizing said obtained machine learning model, said obtained one or more PDWs, and said obtained one or more parameters, the direction of said emitter relative to said platform.

(51) Int. Cl.

| | |
|---|---|
| ***G01S 7/00*** | (2006.01) |
| ***G01S 7/02*** | (2006.01) |
| ***H04W 4/029*** | (2018.01) |

(56) References Cited

U.S. PATENT DOCUMENTS

| | | | | |
|---|---|---|---|---|
| 10,794,983 | B1 | 10/2020 | Chandail et al. | |
| 10,830,865 | B1 * | 11/2020 | Schiffmiller | G01S 5/0249 |
| 11,054,502 | B2 * | 7/2021 | Liechty | G01S 7/2921 |
| 2009/0251354 | A1 | 10/2009 | Zahavi | |
| 2011/0001658 | A1 * | 1/2011 | Noble | G01S 13/524 342/107 |
| 2012/0309288 | A1 * | 12/2012 | Lu | H04K 3/45 455/1 |
| 2017/0003376 | A1 * | 1/2017 | Wellman | H04K 3/822 |
| 2018/0306887 | A1 * | 10/2018 | Robinson | G01S 3/48 |
| 2019/0324107 | A1 * | 10/2019 | Robinson | G01S 7/021 |
| 2020/0049837 | A1 | 2/2020 | Werner et al. | |
| 2020/0256982 | A1 * | 8/2020 | Slaven | G01S 3/043 |
| 2021/0096207 | A1 | 4/2021 | Torrini et al. | |
| 2022/0308151 | A1 | 9/2022 | Merk et al. | |
| 2022/0342037 | A1 * | 10/2022 | Benneckenstein | G01S 7/4052 |
| 2023/0097336 | A1 | 3/2023 | Wozny | |
| 2023/0144796 | A1 * | 5/2023 | DePoy | G06N 20/00 706/12 |
| 2023/0266422 | A1 | 8/2023 | Schober et al. | |
| 2023/0341497 | A1 | 10/2023 | Clymer | |

OTHER PUBLICATIONS

Khan, Aftab et al., "Angle of Arrival Estimation using an Adaptive Machine learning Framework", in IEEE Communications Letters, vol. 23, No. 2, pp. 294-297, Feb. 2019, doi: 10.1109/LCOMM.2018.2884464.

Naseri, Mostafa et al., "Machine Learning-Based Angle of Arrival Estimation for Ultra-Wide Band Radios", in IEEE Communications Letters, vol. 26, No. 6, pp. 1273-1277, Jun. 2022,doi: 10.1109/LCOMM.2022.3167020.

You, Ming-Yi et al., "A Review on Machine Learning-Based Radio Direction Finding", Hindawi, "Mathematical Problems in Engineering", vol. 2020, Article ID 8345413, 9 pages, https://doi.org/10.1155/2020/8345413.

* cited by examiner

300

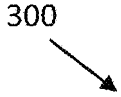

obtain: (i) a machine learning model, capable of receiving: (a) one or more given PDWs associated with a given emitter, and (b) one or more given parameters associated with a given platform, and determining the direction of said given emitter relative to said given platform, (ii) the one or more PDWs of said emitter, provided by said detection system, and, (iii) one or more parameters associated with said platform; and,

302 determine, utilizing said obtained machine learning model, said obtained one or more PDWs, and said obtained one or more parameters, the direction of said emitter relative to said platform.

SYSTEM AND METHOD FOR DETERMINING A DIRECTION OF AN EMITTER RELATIVE TO A PLATFORM

TECHNICAL FIELD

The present invention relates to direction finding, more particularly, to determining the direction of an emitter relative to a platform.

BACKGROUND

Direction finding (DF), or radio direction finding (RDF), is the use of radio waves to determine the direction to a radio emitter. The emitter may be a cooperating radio transmitter, an inadvertent source, a naturally-occurring radio source, or an illicit or enemy system.

Currently, one of the most common methods for determining the direction of a given emitter relative to a given platform involves (i) using the ratio between the most potent pair of adjacent antennas among a plurality of antennas mounted on the given platform, or (ii) using the ratio between the differences of two adjacent antennas of the plurality of antennas mounted on said given platform, which serves as an address to a LookUp Table (LUT) table configured to return a coarse angle of arrival (AOA) value.

In spite of its widespread use, the above method is susceptive to disturbances caused by additional elements mounted on the platform, as well as changes to the platform's state yielded by its maneuvering capabilities.

Thus, there is a need in the art for a new system and method for determining a direction of an emitter relative to a platform.

GENERAL DESCRIPTION

In accordance with a first aspect of the presently disclosed subject matter, there is provided a system for determining a direction of an emitter relative to a platform being distant from the emitter, the system comprising: a detection system, mounted on the platform, capable of providing one or more Pulse Descriptor Words (PDWs) based on an analysis of at least one received signal, emitted by the emitter; and, a processing circuitry, being in an interaction with the detection system, configured to: obtain: (i) a machine learning model, capable of receiving: (a) one or more given PDWs associated with a given emitter, and (b) one or more given parameters associated with a given platform, and determining the direction of the given emitter relative to the given platform, (ii) the one or more PDWs of the emitter, provided by the detection system, and, (iii) one or more parameters associated with the platform; and, determine, utilizing the obtained machine learning model, the obtained one or more PDWs, and the obtained one or more parameters, the direction of the emitter relative to the platform.

In some cases, the parameters include one or more of: the platform's pitch, the platform's roll, or the platform's altitude.

In some cases, the detection system is an Electronic Warfare (EW).

In some cases, the EW system is a wideband EW system.

In some cases, at least one of the PDWs is associated with one or more characteristics of the emitter.

In some cases, the characteristics include at least one of: the emitter's coarse direction, the emitter's normalized antennas power, the emitter's radio frequency, or the emitter's altitude.

In some cases, the machine learning model is trained using a training dataset containing information related to one or more emitters having known locations and directions relative to the platform.

In some cases, the machine learning model is a specific platform model, specific to said platform.

In some cases, at least one of the PDWs is associated with a coarse direction of the emitter relative to the platform, and wherein the direction, determined by the system, is an improved direction being more accurate than the coarse direction.

In some cases, the direction is determined at least partially based on said coarse detection.

In accordance with a second aspect of the presently disclosed subject matter, there is provided a method for determining a direction of an emitter relative to a platform being distant from the emitter comprising: obtaining, by a processing circuitry: (i) a machine learning model, capable of receiving: (a) one or more given PDWs associated with a given emitter and (b) one or more given parameters associated with a given platform, and determining the direction of the given emitter relative to the given platform, (ii) one or more PDWs of the emitter, provided by analysis of at least one received signal, emitted by the emitter; and, (iii) one or more parameters associated with the platform; and, determining, by the processing circuitry, utilizing the obtained machine learning model, the obtained one or more PDWs, and the obtained one or more parameters, the direction of the emitter relative to the platform.

In some cases, the parameters include one or more of: the platform's pitch, the platform's roll, or the platform's altitude.

In some cases, at least one of the PDWs is associated with one or more characteristics of the emitter.

In some cases, the characteristics include at least one of: the emitter's coarse direction, the emitter's normalized antennas power, the emitter's radio frequency, or the emitter's altitude.

In some cases, the machine learning model is trained using a training dataset containing information related to one or more emitters having known locations and directions relative to the platform.

In some cases, the machine learning model is a specific platform model, specific to said platform.

In some cases, at least one of the PDWs is associated with a coarse direction of the emitter relative to the platform, and wherein the direction, determined by the system, is an improved direction being more accurate than the coarse direction.

In some cases, the direction is determined at least partially based on said coarse detection.

In accordance with a third aspect of the presently disclosed subject matter, there is provided a non-transitory computer readable storage medium having computer readable program code embodied therewith, the computer readable program code, executable by at least one processor to perform a method for determining a direction of an emitter relative to a platform being distant from the emitter comprising: obtaining, by a processing circuitry: (i) a machine learning model, capable of receiving: (a) one or more given PDWs associated with a given emitter and (b) one or more given parameters associated with a given platform, and determining the direction of the given emitter relative to the given platform, (ii) one or more PDWs of the emitter, provided by analysis of at least one received signal, emitted by the emitter; and, (iii) one or more parameters associated with the platform; and, determining, by the processing circuitry, utilizing the obtained machine learning model, the obtained one or more PDWs, and the obtained one or more parameters, the direction of the emitter relative to the platform.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
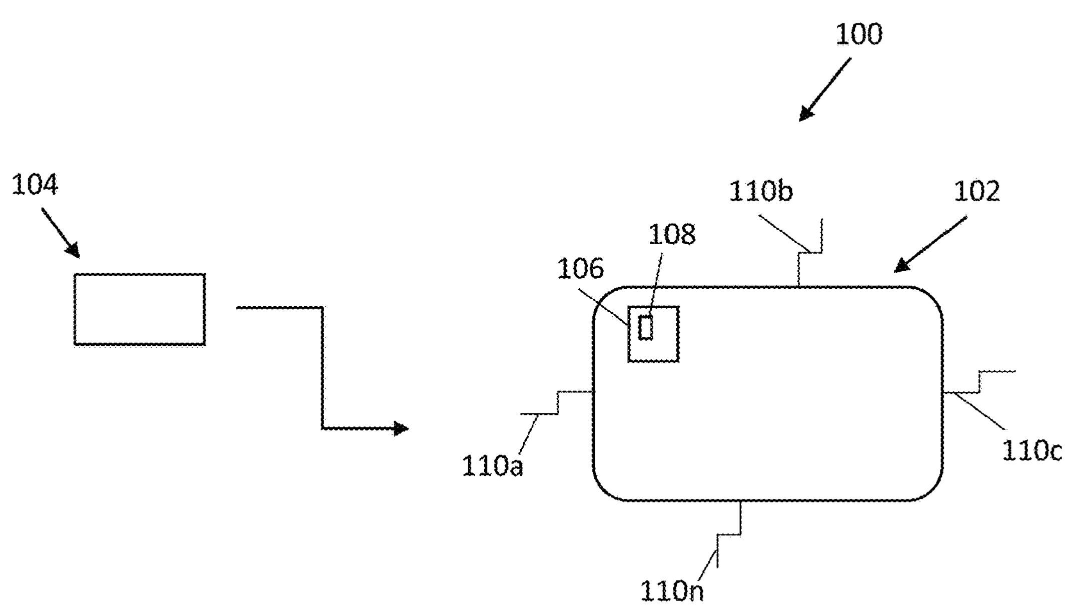
FIG. 1 is a schematic illustration of an environment in which a system for determining a direction of an emitter relative to a platform, in accordance with the presently disclosed subject matter, operates.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "providing", "obtaining", "receiving", "determining", or the like, include action and/or processes of a computer that manipulate and/or transform data into other data, said data represented as physical quantities, e.g., such as electronic quantities, and/or said data representing the physical objects. The terms "computer", "processor", "processing resource", "processing circuitry", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in a least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIG. 3 may be executed. In embodiments of the presently disclosed subject matter one or more stages illustrated in FIG. 3 may be executed in a different order and/or one or more groups of stages may be executed simultaneously. FIG. 1 illustrate a general schematic of the system architecture in accordance with an embodiment of the presently disclosed subject matter. Each module in FIG. 2 may be made up of any combination of software, hardware and/or firmware that performs the functions as defined and explained herein. The modules in FIG. 2 may be centralized in one location or dispersed over more than one location. In other embodiments of the presently disclosed subject matter, the system may comprise fewer, more, and/or different modules than those shown in FIG. 2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any reference in the specification to the term "Pulse Descriptor Words" or "PDWs" should be interpreted as referring to a data structure used in radar and electronic warfare systems to describe the properties of a received pulse signal. The data structure typically contains information about the pulse's parameters, which may include but are not limited to:

Pulse Time of Arrival (TOA): The precise time at which the pulse is received, often measured in microseconds or nanoseconds;

- Pulse Width (PW): The duration of the pulse, usually measured in microseconds or nanoseconds;
- Pulse Amplitude: The strength or power of the pulse, which can be expressed in decibels (dB) or other units of power;
- Pulse Frequency: The carrier frequency of the pulse, typically measured in megahertz (MHz) or gigahertz (GHz);
- Angle of Arrival (AOA): The direction from which the pulse was received, usually defined in degrees relative to a reference point; or,
- Modulation Type: Information on the modulation scheme used in the pulse, if any, such as amplitude modulation (AM), frequency modulation (FM), phase modulation (PM), or pulse code modulation (PCM).

The PDW is a crucial component in signal processing and analysis, providing a standardized format for capturing and transmitting pulse characteristics for further processing, analysis, and decision-making in radar, SIGINT, and electronic warfare systems.

Bearing this in mind, attention is drawn to FIG. 1, showing a schematic illustration of an environment in which a system for determining a direction of an emitter relative to a platform (also interchangeably referred to herein as "system"), in accordance with the presently disclosed subject matter, operates.

As shown in the schematic illustration, environment 100 includes a platform, denoted 102, either mobile or stationary, and at least one emitter, denoted 104, also either mobile or stationary, being distant from said platform (i.e., not mounted on the platform).

Initially, attention is drawn to the platform 102. Platform 102 (for example, a moving platform such as an aerial platform (e.g., a plane, a helicopter, etc.)) may include (i) a system for determining a direction of an emitter relative to a platform 106, mounted thereon, containing a detection system 108 (among other components that will be detailed hereinafter in relation to FIG. 2), and (ii) one or more antennas, denoted 110*a* to 110*n* (n being an arbitrary letter representing any possible integer number), dispersed thereon.

Antennas 110*a* to 110*n* may be directed to enable detection system 108 to continuously or periodically scan across the frequency band in search of emitted signals, so that once received, said signals may be analyzed by said detection system to provide one or more Pulse Descriptor Words (PDWs).

In relation to detection system 108, in one non-limiting example, said detection system may be an Electronic Warfare (EW) system (e.g., a wideband EW system).

In relation to the one or more PDWs, in some cases, at least one of said PDWs provided by detection system 108 may be associated with one or more characteristics of emitter 104. In such cases, the one or more characteristics may include at least one of: emitter's 104 coarse direction, emitter's 104 normalized antennas power, emitter's 104 signal frequency, emitter's 104 signal intensity, emitter's 104 altitude, etc.

Next, attention is directed to the at least one emitter 104. Emitter 104 may be located at a distinct location within environment 100 or travel along a trajectory such that it may move toward or away from said platform 104. In addition, emitter 104 may be directed to emit signals of a specific type and be related to an object (or be the object itself) associated with either an adversary, such that it may pose a threat to said platform 104, or a supporter, such that it does not pose any threat to said platform whatsoever. In one non-limiting example, emitter 104 may be any radio-based system, or components thereof, directed to emit radio emission signals. In another, more specific, non-limiting example, emitter 104 may be a radar-based system (such as air-defense systems, guided missile systems, and the like), or components thereof (e.g., a detection and tracking radar, a guided missile, etc.), directed to emit radar emission signals.

By way of a non-limiting example, presented merely for the purpose of better understanding the presently disclosed subject matter and not intended in any way to limit its scope, platform 104 may be a plane traveling through a hostile environment, while emitter 104 may be a hostile radar system emitting radar emission signals intended to enable the revealing of objects traveling through its monitored environment (e.g., plane 104).

It is to be of note that emitter 104 may either be an active emitter (e.g., a radar system, etc.), sending one or more signals actively, or a passive emitter, reflecting one or more signals emitted towards it (e.g., a reflective signal in response to a radar emission signal being emitted toward emitter 104).

Attention is now drawn to additional components of the system for determining a direction of an emitter relative to a platform 106.

Figure 2:
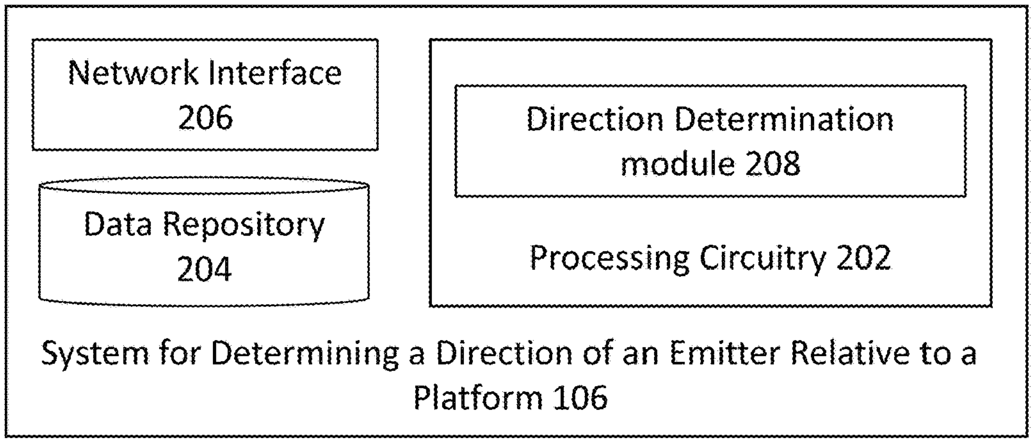
FIG. 2 is a block diagram schematically illustrating one example of components of a system for determining a direction of an emitter relative to a platform, in accordance with the presently disclosed subject matter; and, FIG. 3 is a flowchart illustrating an example of a sequence of operations carried out by a system for determining a direction of an emitter relative to a platform, in accordance with the presently disclosed subject matter.

FIG. 2 is a block diagram schematically illustrating one example of the system for determining a direction of an emitter relative to a platform 106, in accordance with the presently disclosed subject matter.

In accordance with the presently disclosed subject matter, the system for determining a direction of an emitter relative to a platform 106 (also interchangeably referred to herein as "system 106") may comprise a network interface 206. The network interface 206 (e.g., a network card, a Wi-Fi client, 3G/4G client, or any other component), enables system 106 to communicate over a network with external systems and handles inbound and outbound communications from such systems. For example, system 106 may receive, through network interface 206, one or more parameters associated with platform 102.

System 106 may further comprise or be otherwise associated with a data repository 204 (e.g., a database, a storage system, a memory including Read Only Memory—ROM, Random Access Memory—RAM, or any other type of memory, etc.) configured to store data. Some examples of data that may be stored in the data repository 204 include:

- One or more parameters associated with platform 102;
- One or more PDWs associated with at one or more emitters;
- One or more characteristics of one or more emitters;
- One or more training data sets containing information related to one or more emitters having known locations and directions relative to platform 102;
- One or more coarse directions of one or more emitters relative to platform 102; etc.

Data repository 204 may be further configured to enable retrieval and/or update and/or deletion of the stored data. It is to be noted that in some cases, data repository 204 may be distributed, while the system 106 has access to the information stored thereon, e.g., via a wired or wireless network to which system 106 is able to connect (utilizing its network interface 206).

System 106 further comprises processing circuitry 202. Processing circuitry 202 may be one or more processing units (e.g., central processing units), microprocessors, microcontrollers (e.g., microcontroller units (MCUs)) or any other computing devices or modules, including multiple and/or parallel and/or distributed processing units, which are adapted to independently or cooperatively process data for controlling relevant system 106 resources and for enabling operations related to system's 106 resources.

The processing circuitry 202 comprises a direction determination module 208, configured to perform a direction determination process, as further detailed herein, inter alia with reference to FIG. 3.

Turning to FIG. 3 there is shown a flowchart illustrating one example of operations carried out by the system for determining a direction of an emitter relative to a platform 106, in accordance with the presently disclosed subject matter.

Accordingly, the system for determining a direction of an emitter relative to a platform 106 (also interchangeably referred to hereafter as "system 106") may be configured to perform a direction determination process 300, e.g., using direction determination module 208.

For this purpose, system 106 obtains: (i) a machine learning model capable of receiving: (a) one or more given PDWs associated with a given emitter and (b) one or more given parameters associated with a given platform, and determining a given direction of said given emitter relative to said given platform, (ii) one or more PDWs of said emitter, provided by system's 106 detection system 108, and (iii) one or more parameters associated with said platform (block 302).

In relation to the aforementioned machine learning model, the machine learning model may be trained using a training dataset containing information related to one or more emitters having known locations and directions relative to said platform (e.g., stationary emitters). In some cases, the training may be conducted while the system is in offline or sleep mode, using, for example, recordings of past trajectories performed by said platform. In other cases, alternatively or additionally to the above, the training can be conducted in real-time, i.e., during a current trajectory of said platform, for example, as a predetermined stage to the direction determination process (e.g., while the platform intended to travel to a hostile environment, where the direction determination process is ought to occur, is passing through a friendly environment in which friendly stationary emitters are dispersed).

In some cases, the training dataset may be either sporadically or continuously updated. In other cases, alternatively or additionally to the above, the training dataset may be updated during different system modes (e.g., (i) during the system being in offline or sleep mode, using, for example, recordings of past trajectories performed by said platform, (ii) during the system being in operation mode, i.e., while a direction determination of an emitter relative to said platform is required).

In some cases, alternatively or additionally to the above, the training dataset may include information from a plurality of platforms, for example, platforms of the same kind (e.g., airplanes of the same type), platforms of different kinds (e.g., airplanes of different types), or a combination thereof, and may therefore be applicable to a variety of platforms. In other cases, the training dataset may be distinct to the platform on which system 106 is mounted (i.e., includes training data associated with said platform only), so that the machine learning model of said platform becomes a specific platform model, specific to said platform. For example, the machine learning model of platform no. 151 may be trained utilizing former trajectories performed by said platform only.

In relation to the aforementioned parameters, in some cases, the parameters may be associated with the platform's orientation, e.g., the platform's pitch, the platform's roll, the platform's altitude, etc.

Once obtained, system 106 determines, utilizing the obtained machine learning model, the obtained one or more PDWs, and the obtained one or more parameters, the direction of said emitter relative to said platform (block 304).

In relation to the aforementioned PDWs, in some cases, at least one of said PDWs may be associated with a coarse direction of the emitter relative to said platform, and the determined direction, determined by system 106, may be an improved direction being more accurate than said coarse direction. In some cases, the direction may be determined at least partially based on said coarse detection.

It is to be noted, with reference to FIG. 3, that some of the blocks may be integrated into a consolidated block or may be broken down to a few blocks and/or other blocks may be added. It is to be further noted that some of the blocks are optional. It should be also noted that whilst the flow diagram is described also with reference to the system elements that realizes them, this is by no means binding, and the blocks may be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter may be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system for determining a direction of an emitter relative to a platform being distant from said emitter, said system comprising:

a detection system, mounted on said platform, configured to analyze at least one received signal emitted by said emitter and provide one or more Pulse Descriptor Words (PDWs), wherein at least one of said PDWs is associated with one or more signal intensities of said least one received signal; and, a processing circuitry, in interaction with said detection system, configured to:

obtain:

(i) a machine learning model; capable of receiving: (a) one or more given PDWs associated with a given emitter, and (b) one or more given parameters associated with a given platform, and determining a given direction of said given emitter relative to said given platform, wherein said model is trained using a training dataset containing information relating to one or more emitters having known locations and directions relative to said platform, and wherein said machine learning model is a specific platform model, specific to said platform;

(ii) the one or more PDWs of said emitter, provided by said detection system, and, (iii) one or more parameters associated with a physical state of said platform, the one or more parameters comprising at least one of a pitch of said platform or a roll of said platform; and, determine, utilizing said obtained machine learning model, said obtained one or more PDWs, and said obtained one or more parameters associated with the physical state of said platform, a refined direction of said emitter relative to said platform, wherein said refined direction is determined based at least in part on said signal intensities.

2. The system of claim 1, wherein the one or more parameters associated with the physical state of said platform comprise a pitch of said platform and a roll of said platforms.

3. The system of claim 1, wherein said detection system is an Electronic Warfare (EW).

4. The system of claim 3, wherein said EW system is a wideband EW system.

5. The system of claim 1, wherein at least one of said PDWs is associated with one or more characteristics of said emitter.

6. The system of claim 5, wherein said characteristics include at least one of: a coarse direction of said emitter, normalized antennas power associated with said emitter, a radio frequency of said emitter, or an altitude of said emitter.

7. A method for determining a direction of an emitter relative to a platform being distant from said emitter comprising:

obtaining, by a processing circuitry:

(i) a machine learning model; capable of receiving: (a) one or more given PDWs associated with a given emitter and (b) one or more given parameters associated with a given platform, and determining the direction of said given emitter relative to said given platform, wherein said model is trained using a training dataset containing information relating to one or more emitters having known locations and directions relative to said platform, and wherein said machine learning model is a specific platform model, specific to said platform;

(ii) one or more PDWs of said emitter, provided by analysis of at least one received signal, emitted by said emitter, wherein at least one of said PDWs is associated with one or more signal intensities of said least one received signal; and, (iii) one or more parameters associated with a physical state of said platform, the one or more parameters comprising at least one of a pitch of said platform or a roll of said platform; and, determining, by said processing circuitry, utilizing said obtained machine learning model, said obtained one or more PDWs, and said obtained one or more parameters associated with the physical state of said platform, a refined direction of said emitter relative to said platform, wherein said refined direction is determined based at least in part on said signal intensities.

8. The method of claim 7, wherein said parameters associated with the physical state of said platform comprise a pitch of said platform and a roll of said platform.

9. The method of claim 7, wherein at least one of said PDWs is associated with one or more characteristics of said emitter.

10. The method of claim 9, wherein said characteristics include at least one of: a coarse direction of said emitter, normalized antenna power associated with said emitter, a radio frequency of said emitter, or an altitude of said emitter.

11. A non-transitory computer readable storage medium having computer readable program code embodied therewith, the computer readable program code, executable by at least one processor to perform a method for determining a direction of an emitter relative to a platform being distant from said emitter comprising:

obtaining, by a processing circuitry:

(i) a machine learning model, capable of receiving: (a) one or more given PDWs associated with a given emitter and (b) one or more given parameters associated with a given platform, and determining the direction of said given emitter relative to said given platform, wherein said model is trained using a training dataset containing information relating to one or more emitters having known locations and directions relative to said platform, and wherein said machine learning model is a specific platform model, specific to said platform;

ii) one or more PDWs of said emitter, provided by analysis of at least one received signal, emitted by said emitter, wherein at least one of said PDWs is associated with one or more signal intensities of said least one received signal; and, (iii) one or more parameters associated with a physical state of said platform, the one or more parameters comprising at least one of a pitch of said platform or a roll of said platform; and, determining, by said processing circuitry, utilizing said obtained machine learning model, said obtained one or more PDWs, and said obtained one or more parameters associated with the physical state of said platform, a refined direction of said emitter relative to said platform, wherein said refined direction is determined based at least in part on said signal intensities.

* * * * *